US012725777B2

(12) United States Patent
Takebayashi

(10) Patent No.: US 12,725,777 B2
(45) Date of Patent: Sep. 1, 2026

(54) PRODUCING METHOD FOR LITHIUM-ION SECONDARY BATTERY

(71) Applicant: PRIME PLANET ENERGY & SOLUTIONS, INC., Tokyo (JP)

(72) Inventor: Yoshitomo Takebayashi, Nisshin (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 719 days.

(21) Appl. No.: 18/135,524

(22) Filed: Apr. 17, 2023

(65) Prior Publication Data

US 2023/0387377 A1 Nov. 30, 2023

(30) Foreign Application Priority Data

May 26, 2022 (JP) ................................ 2022-085955

(51) Int. Cl.
*H01M 4/04* (2006.01)
*H01M 4/131* (2010.01)
(Continued)

(52) U.S. Cl.
CPC ......... *H01M 4/0404* (2013.01); *H01M 4/131* (2013.01); *H01M 4/661* (2013.01); (Continued)

(58) Field of Classification Search
CPC ... H01M 4/13; H01M 4/131; H01M 2004/028
See application file for complete search history.

(56) References Cited

U.S. PATENT DOCUMENTS 8,658,316 B2 * 2/2014 Kitagawa .............. H01M 4/625 252/182.1
10,026,955 B2 * 7/2018 Shindo .................... H01M 4/62
(Continued)

FOREIGN PATENT DOCUMENTS

CN 113921755 A * 1/2022 ........ H01M 10/0562
JP 2001-283849 A 10/2001
(Continued)

OTHER PUBLICATIONS

Machine translation of JP 2001-283849 (no date) (Year: 0000).*
Machine translation of JP 2014-082050 (no date) (Year: 0000).*

*Primary Examiner* — Amanda C. Walke
(74) *Attorney, Agent, or Firm* — Finnegan, Henderson, Farabow, Garrett, and Dunner, LLP

(57) ABSTRACT

A producing method for a lithium-ion secondary battery includes a positive-electrode-paste producing step of producing a positive electrode paste by mixing positive active material particles with a solvent, a positive-electrode-plate producing step of applying and drying the positive electrode paste on a surface of a positive current collecting foil to produce a positive electrode plate, an electrode body producing step of producing an electrode body having the positive electrode plate and a negative electrode plate, a housing step of housing the electrode body in a battery case, an injecting step of injecting non-aqueous electrolytic solution in the battery case housed with the electrode body to produce an injection-completed battery, and an initial charging step of initially charging the injection-completed battery. The positive-electrode-paste producing step is to produce the positive electrode paste in which hydroxide particles are further mixed.

1 Claim, 6 Drawing Sheets

(51) Int. Cl.

| | |
|---|---|
| ***H01M 4/66*** | (2006.01) |
| ***H01M 50/103*** | (2021.01) |
| *H01M 4/02* | (2006.01) |
| *H01M 10/0525* | (2010.01) |

(52) U.S. Cl.

CPC .... *H01M 50/103* (2021.01); *H01M 2004/028* (2013.01); *H01M 10/0525* (2013.01); *H01M 2300/0034* (2013.01)

(56) References Cited

U.S. PATENT DOCUMENTS

| | | | | |
|---|---|---|---|---|
| 2006/0134520 | A1 | 6/2006 | Ishii et al. | |
| 2016/0064729 | A1 | 3/2016 | Shindo | |
| 2018/0309159 | A1 | 10/2018 | Hori | |
| 2019/0273256 | A1 | 9/2019 | Yokoyama | |
| 2020/0388886 | A1* | 12/2020 | Yokoyama | H01M 4/364 |
| 2021/0098785 | A1 | 4/2021 | Kim et al. | |

FOREIGN PATENT DOCUMENTS

| | | | |
|---|---|---|---|
| JP | 2008-21538 | A | 1/2008 |
| JP | 2014-082050 | A | 5/2014 |
| JP | 2016-051610 | A | 4/2016 |
| JP | 2018-060689 | A | 4/2018 |
| JP | 2018-185905 | A | 11/2018 |
| JP | 2019-153462 | A | 9/2019 |

* cited by examiner

PRODUCING METHOD FOR LITHIUM-ION SECONDARY BATTERY

CROSS-REFERENCE TO RELATED APPLICATIONS

This application is based upon and claims the benefit of priority from the prior Japanese Patent Application No. 2022-085955 filed on May 26, 2022, the entire contents of which are incorporated herein by reference.

BACKGROUND

Technical Field

The present disclosure relates to a producing method for a lithium-ion secondary battery.

Related Art

JP Patent Application Publication No. 2018-060689A has disclosed a producing method for a lithium-ion secondary battery including a positive electrode plate provided with a positive active material layer on a surface of a positive current collecting foil formed of an aluminum foil, a negative electrode plate, and non-aqueous electrolytic solution including $LiPF_6$.

SUMMARY

Technical Problems

Such as boost charging, when a large electric load is energized to the lithium-ion secondary battery, which includes the positive electrode plate provided with the positive active material layer on the surface of the positive current collecting foil that is formed of the aluminum foil, the negative electrode plate, and the non-aqueous electrolytic solution, there is a case that some local points on the positive current collecting foil could exhibit high potential. Then, these local points with high potential could be corroded to bring about liquation of Al (aluminum) from surfaces of those points. Deposition of the thus liquated aluminum on a surface of the negative electrode could cause internal short-circuit. Specifically, in a lithium-ion secondary battery at an initial stage of use, liquation of aluminum might be caused due to the above-mentioned corrosion since a surface of the positive current collecting foil has not been well coated with $AlF_3$ that has high corrosion resistance.

To address the above problem, in a lithium-ion secondary battery of the JP Patent Application Publication No. 2018-060689A, $LiBF_4$ and LiFOB are made to be added to the non-aqueous electrolytic solution as additives for promoting formation of $AlF_3$ coating on the surface of a positive current collecting foil. However, these additives are expensive, and there is still a possibility of generation of Al liquation due to the corrosion since formation of the $AlF_3$ coating is not enough at the initial stage of use in a case of performing the high-load energization such as boost charging.

The present disclosure has been made in view of the above circumstances, and has a purpose of providing a producing method for a lithium-ion secondary battery that can achieve reduction in "Al liquation from a surface of a positive current collecting foil when high-load energization is performed at an initial stage of use."

Means of Solving the Problems (1) One aspect of the present disclosure is a method for producing a lithium-ion secondary battery comprising a positive electrode plate provided with a positive active material layer on a surface of a positive current collecting foil formed of an aluminum foil, a negative electrode plate, non-aqueous electrolytic solution including $LiPF_6$, and a battery case to house the positive electrode plate, the negative electrode plate, and the non-aqueous electrolytic solution, the producing method including: producing a positive electrode paste by mixing positive active material particles with a solvent; applying the positive electrode paste on the surface of the positive current collecting foil and drying the applied positive electrode paste to produce the positive electrode plate having the positive active material layer on the surface of the positive current collecting foil; providing the positive electrode plate and the negative electrode plate to produce an electrode body; housing the electrode body in the battery case; injecting the non-aqueous electrolytic solution into the battery case housed with the electrode body to produce an injection-completed battery; and initially charging the injection-completed battery, wherein the positive-electrode-paste further includes hydroxide particles.

According to the above-mentioned method for producing the lithium-ion secondary battery, the hydroxide particles are further mixed in addition to the positive active material particles and the solvent so that the positive electrode paste including the hydroxide particles is produced. Thereafter, the positive electrode paste including the hydroxide particles is applied on the surface of the positive current collecting foil and the thus applied positive electrode paste is dried, and thereby the positive electrode plate provided with the positive active material layer including the hydroxide particles on the surface of the positive current collecting foil is produced. Then, the lithium-ion secondary battery is produced by use of this positive electrode plate.

Production of the lithium-ion secondary battery by use of the above-mentioned positive electrode plate makes it easier to form coating of $AlF_3$ with high corrosion resistance on the surface of the positive current collecting foil in a producing process of the subject battery as compared with the conventional technique. Specifically, during a term from post-injection of non-aqueous electrolytic solution into a battery case, in which a positive electrode plate and others are housed, to completion and getting ready for shipment of the battery, coating formation reaction of $AlF_3$ on the surface of the positive current collecting foil is promoted further than the case of the conventional technique. The coating formation reaction of $AlF_3$ is promoted especially in the process of the initial charging. Accordingly, the lithium-ion secondary battery produced as mentioned above has high corrosion resistance on the surface of the positive current collecting foil at the time when the battery is completed and gets ready for shipment as compared with a conventional lithium-ion secondary battery. Therefore, the lithium-ion secondary battery produced by the above producing method can achieve reduction in "Al liquation from the surface of the positive current collecting foil when the high-load energization is performed at the initial stage of use" as compared with the conventional lithium-ion secondary battery.

When LiOH particles are used as the hydroxide particles to be added to the positive electrode paste, coating of $AlF_3$ with high corrosion resistance is formed on the surface of the positive current collecting foil (aluminum foil) by a series of the following reactions (a) to (c). The surface of the positive current collecting foil (the aluminum foil) to be then used for a process of positive-electrode-plate producing is coated with $Al_2O_3$ which is an oxide film.

(a) LiOH in the positive active material layer is decomposed, and thus $H_2O$ is formed.

$$2LiOH \rightarrow Li_2O + H_2O \quad \text{(Formula 1)}$$

(b) The formed $H_2O$ makes reaction with $LiPF_6$ in the non-aqueous electrolytic solution, and thus HF is formed.

$$LiPF_6 + H_2O \rightarrow LiF + POF_3 + 2HF \quad \text{(Formula 2)}$$

(c) The formed HF makes reaction with $Al_2O_3$ coating on the surface of the positive current collecting foil, and thus coating of $AlF_3$ is formed on the surface of the positive current collecting foil.

$$Al_2O_3 + 6HF \rightarrow 2AlF_3 + 3H_2O \quad \text{(Formula 3)}$$

In a case where hydroxide particles other than LiOH particles are used as the hydroxide particles to be added to the positive electrode paste, too, the hydroxide particles are decomposed in the positive active material layer to form $H_2O$. Thereby, the reactions of the above-mentioned formulas 2 and 3 occur, and thus coating of $AlF_3$ is similarly formed on the surface of the positive current collecting foil.

(2) Further, in the producing method for the lithium-ion secondary battery according to the above (1), preferably, the hydroxide particles are LiOH particles.

LiOH particles are used as the hydroxide particles to be mixed in the positive electrode paste to form coating of $AlF_3$ on the surface of the positive current collecting foil in the producing process of the subject battery as mentioned above. Therefore, even when high-load energization is performed at the initial use of the battery, occurrence of Al liquation from the surface of the positive current collecting foil can be reduced. Further, decomposition of LiOH in the positive active material layer preferably results in production of Li which is useful for the lithium-ion secondary battery.

(3) Further, in the producing method for the lithium-ion secondary battery according to the above (1) or (2), preferably, wherein in the positive electrode paste producing, mixing ratio of solid content of the positive electrode paste exclusive of the hydroxide particles to the hydroxide particles is within a range from 0.5 wt % or more to less than 5.0 wt %.

The mixing ratio of the hydroxide particles to the solid contents exclusive of the hydroxide particles among the solid contents of the positive electrode paste is arranged to be 0.5 wt % or more so that coating of $AlF_3$ is further easily formed on the surface of the positive current collecting foil. Thereby, occurrence of Al liquation from the surface of the positive current collecting foil can be prevented. However, if the mixing ratio of the hydroxide particles is 5.0 wt % or more, the discharge capacity of the battery largely declines. Accordingly, the mixing ratio of the hydroxide particles to the solid contents exclusive of the hydroxide particles among the solid contents of the positive electrode paste is preferably within the range from 0.5 wt % or more to less than 5.0 wt %. Herein, the solid contents of the positive electrode paste are components of the positive electrode paste other than the solvent.

DETAILED DESCRIPTION OF THE EXEMPLARY EMBODIMENTS

Figure 1:
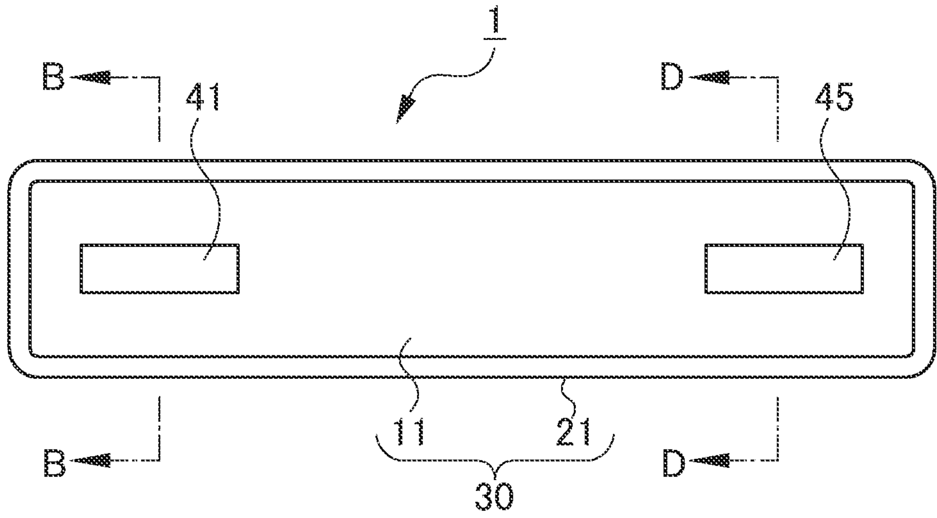
FIG. 1 is a top plan view of a lithium-ion secondary battery according to an embodiment.
Figure 2:
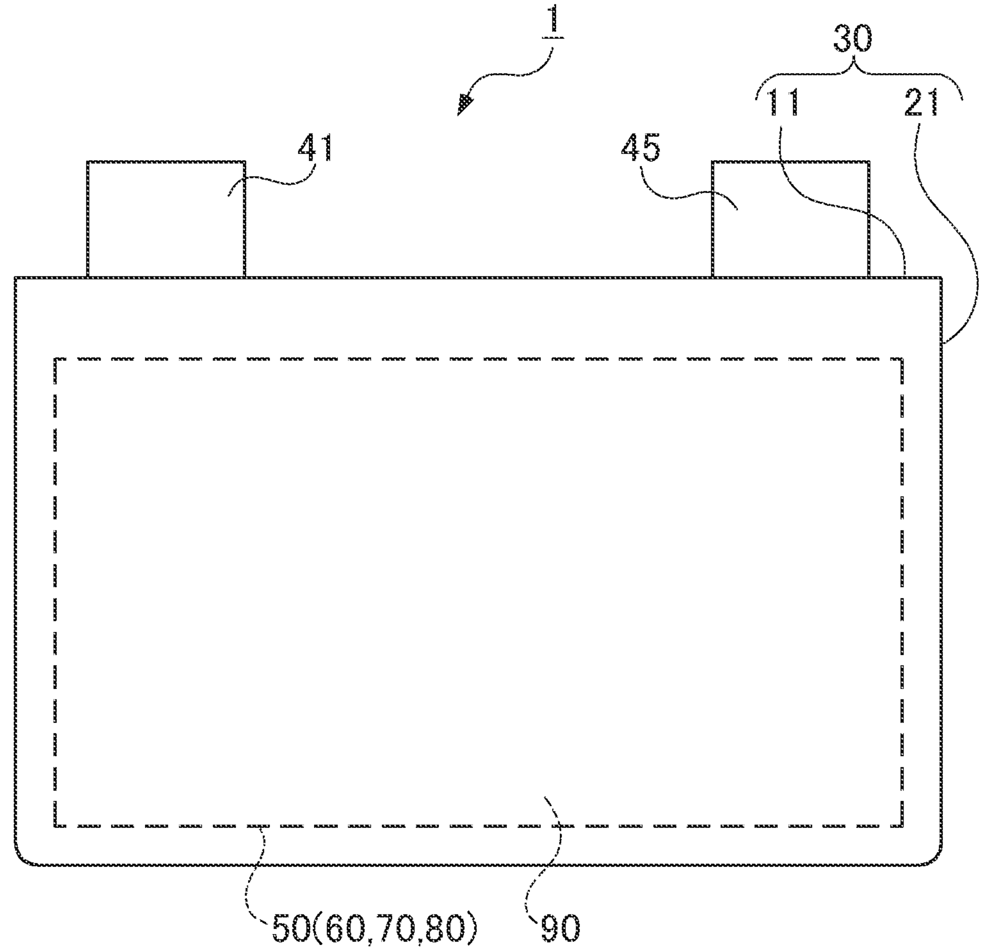
FIG. 2 is a front view of the lithium-ion secondary battery.

An embodiment of the present disclosure is now explained. A lithium-ion secondary battery 1 according to the present embodiment is provided with a battery case 30, an electrode body 50 housed in the battery case 30, a positive electrode terminal member 41, and a negative electrode terminal member 45 (see FIG. 1 and FIG. 2). The battery case 30 is a metal-made hard case of a rectangular-parallelepiped box-like shape. This battery case 30 is provided with a metal-made case body 21 of a bottomed rectangular cylindrical shape and a metal-made lid 11 of a rectangular plate-like shape for closing an opening of the case body 21 (see FIG. 1 and FIG. 2).

The lid 11 is formed with two rectangular-cylindrical-shaped through holes of a first through hole and a second through hole (not shown). The positive electrode terminal member 41 is inserted in the first through hole and the negative electrode terminal member 45 is inserted in the second through hole (see FIG. 1 and FIG. 2). Herein, a cylindrical insulation member (not shown) is interposed between an inner circumferential surface of the first through hole of the lid 11 and an outer circumferential surface of the positive electrode terminal member 41, and another cylindrical insulation member is interposed between an inner circumferential surface of the second through hole of the lid 11 and an outer circumferential surface of the negative electrode terminal member 45.

Figure 8:
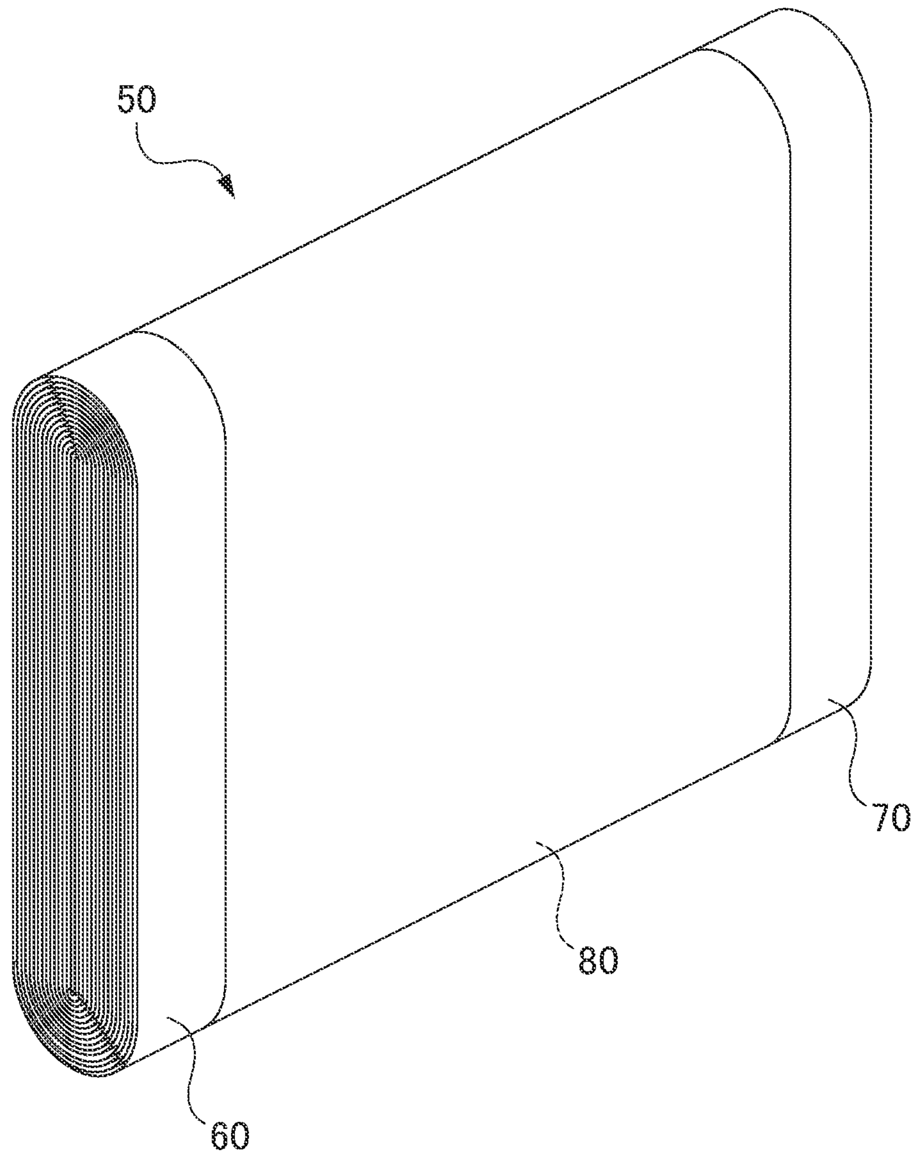
FIG. 8 is a perspective view of an electrode body of the lithium-ion secondary battery.

The electrode body 50 includes a positive electrode plate 60, a negative electrode plate 70, and a separator 80 interposed between the positive electrode plate 60 and the negative electrode plate 70. Specifically, the electrode body 50 is provided with the strip-shaped positive electrode plate 60, the strip-shaped negative electrode plate 70, and the strip-shaped separator 80, and is a wound electrode body formed by winding the positive electrode plate 60 and the negative electrode plate 70 with the separator 80 interposed therebetween (see FIG. 8). Further, inside the electrode body 50, non-aqueous electrolytic solution 90 is contained (see FIG. 2). The non-aqueous electrolytic solution 90 is contained also on a bottom side of the battery case 30. The positive electrode plate 60 of the electrode body 50 is connected to the positive electrode terminal member 41 in the battery case 30. Further, the negative electrode plate 70 is connected to the negative electrode terminal member 45 in the battery case 30.

Figure 6:
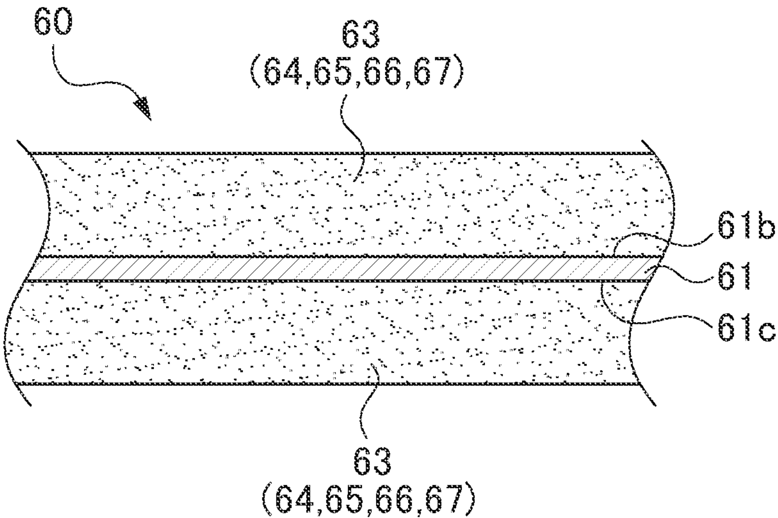
FIG. 6 is a sectional view of a positive electrode plate of the lithium-ion secondary battery.

The positive electrode plate 60 includes a positive current collecting foil 61 formed of an aluminum foil and positive active material layers 63 laminated on surfaces (that is, a first surface 61*b* and a second surface 61*c*) of the positive current collecting foil 61 (see FIG. 6). The positive active material layer 63 includes positive active material particles 64, a binder 65, a conductive material 66, and hydroxide particles 67. In the present embodiment, as the positive active material particles 64, lithium transition metal composite oxide particles, specifically, particles of $Li(Ni_{1/3}Mn_{1/3}Co_{1/3})O_2$ are used. Further, PVDF is used as the binder 65, and acetylene black is used as the conductive material 66. Further, LiOH particles are used as the hydroxide particles 67.

Figure 7:
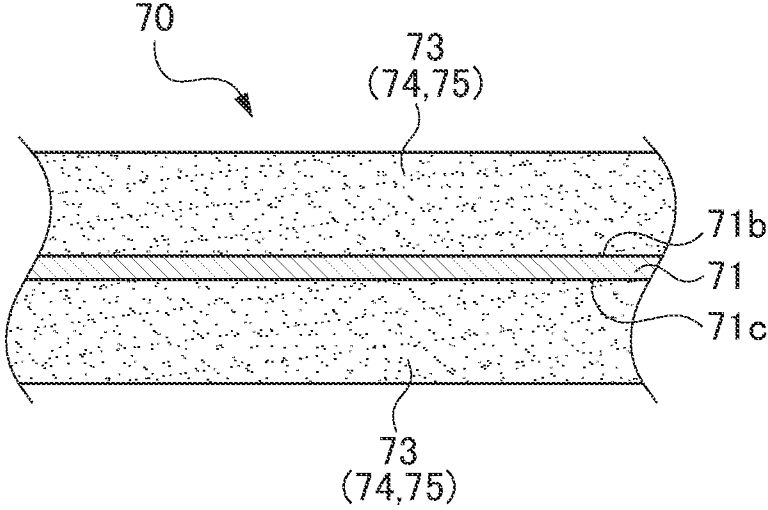
FIG. 7 is a sectional view of a negative electrode plate of the lithium-ion secondary battery.

The negative electrode plate 70 includes a negative current collecting foil 71 formed of a copper foil and negative active material layers 73 laminated on surfaces (that is, a first surface 71*b* and a second surface 71*c*) of the negative current collecting foil 71 (see FIG. 7). The negative active material layer 73 includes negative active material particles 74 and a binder 75. In the present embodiment, graphite particles are used as the negative active material particles 74. Further, CMC (carboxymethyl cellulose) and SBR (styrene-butadiene rubber) are used as the binder 75.

The separator 80 includes a porous resin sheet made of polyolefin and a thermal resistance layer formed of thermally resistant particles which is formed on a surface of the porous resin sheet. In the present embodiment, a porous resin sheet of three-layer structure, in which a porous polyethylene layer is interposed between two porous polypropylene layers, is used as the porous resin sheet. Further, the non-aqueous electrolytic solution 90 includes organic solvent (specifically, ethylene carbonate, ethyl methyl carbonate, and dimethyl carbonate) and $LiPF_6$.

Figure 3:
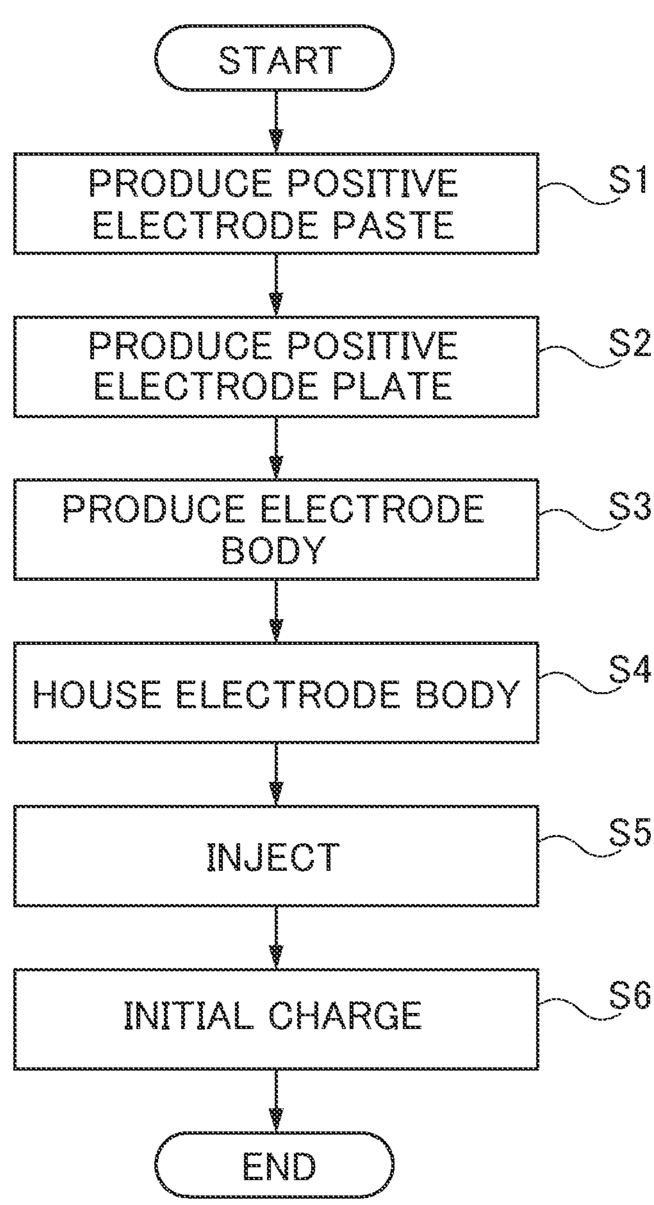
FIG. 3 is a flow chart indicating steps of a producing method for the lithium-ion secondary battery.
Figure 4:
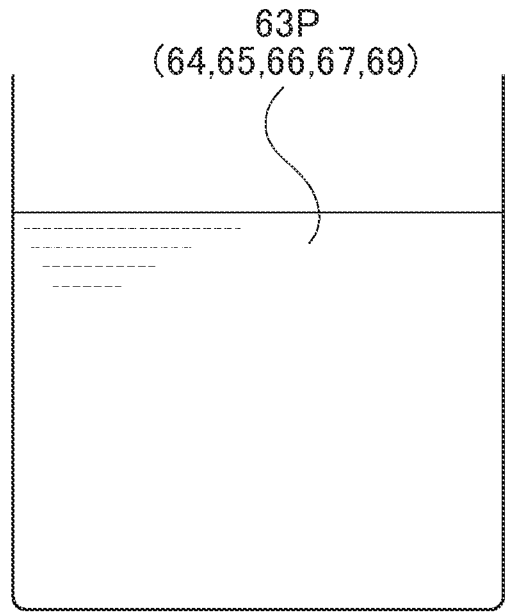
FIG. 4 is an explanatory view for explaining the producing method for the lithium-ion secondary battery.

Next, a producing method for the lithium-ion secondary battery 1 according to the embodiment is explained. FIG. 3 is a flow chart indicating steps of the producing method for the lithium-ion secondary battery 1. Firstly, in step S1 of a positive electrode paste producing step, a positive electrode paste 63P is produced. Specifically, the positive active material particles 64, the binder 65, the conductive material 66, the hydroxide particles 67, and a solvent 69 are mixed to produce the positive electrode paste 63P (see FIG. 4). Among components of the positive electrode paste 63P, the positive active material particles 64, the binder 65, the conductive material 66, and the hydroxide particles 67 are solid contents.

In the positive electrode paste producing step of the present embodiment, the mixing ratio of the hydroxide particles 67 to the solid contents (specifically, the positive active material particles 64, the binder 65, and the conductive material 66) exclusive of the hydroxide particles 67 among the solid contents of the positive electrode paste 63P is arranged to be within a range of 0.5 wt % or more to less than 5.0 wt %. Namely, the positive electrode paste 63P of the present embodiment is arranged such that weight ratio of the hydroxide particles 67 relative to the solid contents (specifically, the positive active material particles 64, the binder 65, and the conductive material 66) exclusive of the hydroxide particles 67 among the solid contents of the positive electrode paste 63P is within the range of 0.5 wt % or more to less than 5.0 wt %. In other words, when the weight ratio of the solid contents except the hydroxide particles 67 of the whole solid contents of the positive electrode paste 63P (specifically, the positive active material particles 64, the binder 65, and the conductive material 66) and the hydroxide particles 67 is represented as 100:x, a relation of $0.5 \leq x \leq 5.0$ is satisfied. The solid contents of the positive electrode paste 63P is a component of the positive electrode paste 63P other than the solvent 69.

In the present embodiment, as the positive active material particles 64, lithium transition metal composite oxide particles, specifically, particles of $Li(Ni_{1/3}Mn_{1/3}Co_{1/3})O_2$ are used. Further, as the binder 65, PVDF is used, and as the conductive material 66, acetylene black is used. Furthermore, LiOH particles are used as the hydroxide particles 67.

Figure 5:
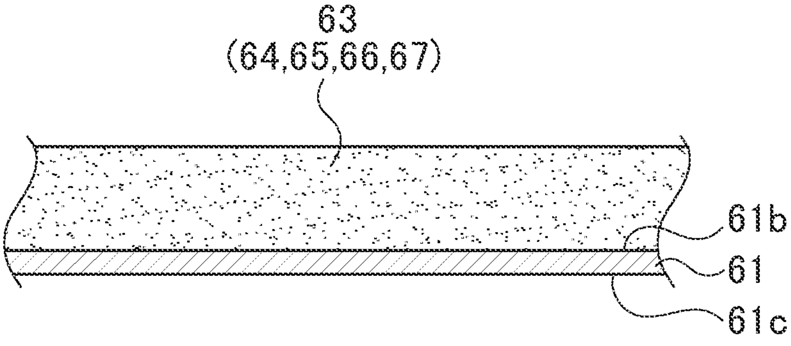
FIG. 5 is another explanatory view for explaining the producing method for the lithium-ion secondary battery.

Specifically, in step S2 of a positive electrode plate producing step, the positive electrode paste 63P is firstly applied on the first surface 61*b* of the strip-shaped positive current collecting foil 61. Thus, a positive electrode paste layer formed of the positive electrode paste 63P is formed on the first surface 61*b* of the positive current collecting foil 61. Next, the positive electrode paste 63P, specifically, the positive electrode paste layer formed of the positive electrode paste 63P, which has been applied on the first surface 61*b* of the positive current collecting foil 61, is dried. Thereby, the solvent 69 is evaporated from the positive electrode paste layer formed of the positive electrode paste 63P, and thus the positive active material layer 63 is formed on the first surface 61*b* of the positive current collecting foil 61 (see FIG. 5). Similarly, the positive active material layer 63 is formed also on the second surface 61*c* of the positive current collecting foil 61 to produce the strip-shaped positive electrode plate 60 (see FIG. 6). Herein, the first surface 61*b* and the second surface 61*c* of the positive current collecting foil 61, which is formed of the aluminum foil and is to be used in step S2 of the positive electrode plate producing step, are coated with $Al_2O_3$ which is an oxide film.

Thereafter, in step S3 of an electrode body producing step, the electrode body 50, which includes the strip-shaped positive electrode plate 60, the strip-shaped negative electrode plate 70, and the strip-shaped separator 80 interposed between the positive electrode plate 60 and the negative electrode plate 70, is produced. Specifically, in a manner that the separator 80 is interposed between the positive electrode plate 60 and the negative electrode plate 70, the positive electrode plate 60, the negative electrode plate 70, and the separator 80 are wound to configure the electrode body 50 as a wound electrode body (see FIG. 8).

Subsequently, in step S4 of a housing step, the electrode body 50 is housed inside the battery case 30. Specifically, the lid 11 is firstly prepared and the positive electrode terminal member 41 and the negative electrode terminal member 45 are assembled to this lid 11. Thereafter, the positive electrode terminal member 41 assembled to the lid 11 is connected to the positive electrode plate 60 in the electrode body 50. To be more specific, the positive electrode terminal member 41 and the positive electrode plate 60 included in the electrode body 50 are welded. Furthermore, the negative electrode terminal member 45 assembled to the lid 11 is connected to the negative electrode plate 70 in the electrode body 50. To be more specific, the negative electrode terminal member 45 and the negative electrode plate 70 included in the electrode body 50 are welded. Thereby, the lid 11 and the electrode body 50 are integrated by the positive electrode terminal member 41 and the negative electrode terminal member 45.

Subsequently, the electrode body 50 integrated with the lid 11 is housed in the case body 21 and an opening of the case body 21 is closed by the lid 11. In this state, the lid 11 and the case body 21 are welded over the entire circumference. The case body 21 and the lid 11 are thus joined to configure the battery case 30, and thereby an assembly-completed battery 1A is produced (see FIG. 9). The assembly-completed battery 1A is a structure in which the battery case 30, the electrode body 50, the positive electrode terminal member 41, and the negative electrode terminal member 45 are assembled. To be specific, the assembly completed battery 1A is provided with the battery case 30, the electrode body 50 housed in the battery case 30, and the positive electrode terminal member 41 and the negative electrode terminal member 45, which are connected to the electrode body 50.

Figure 9:
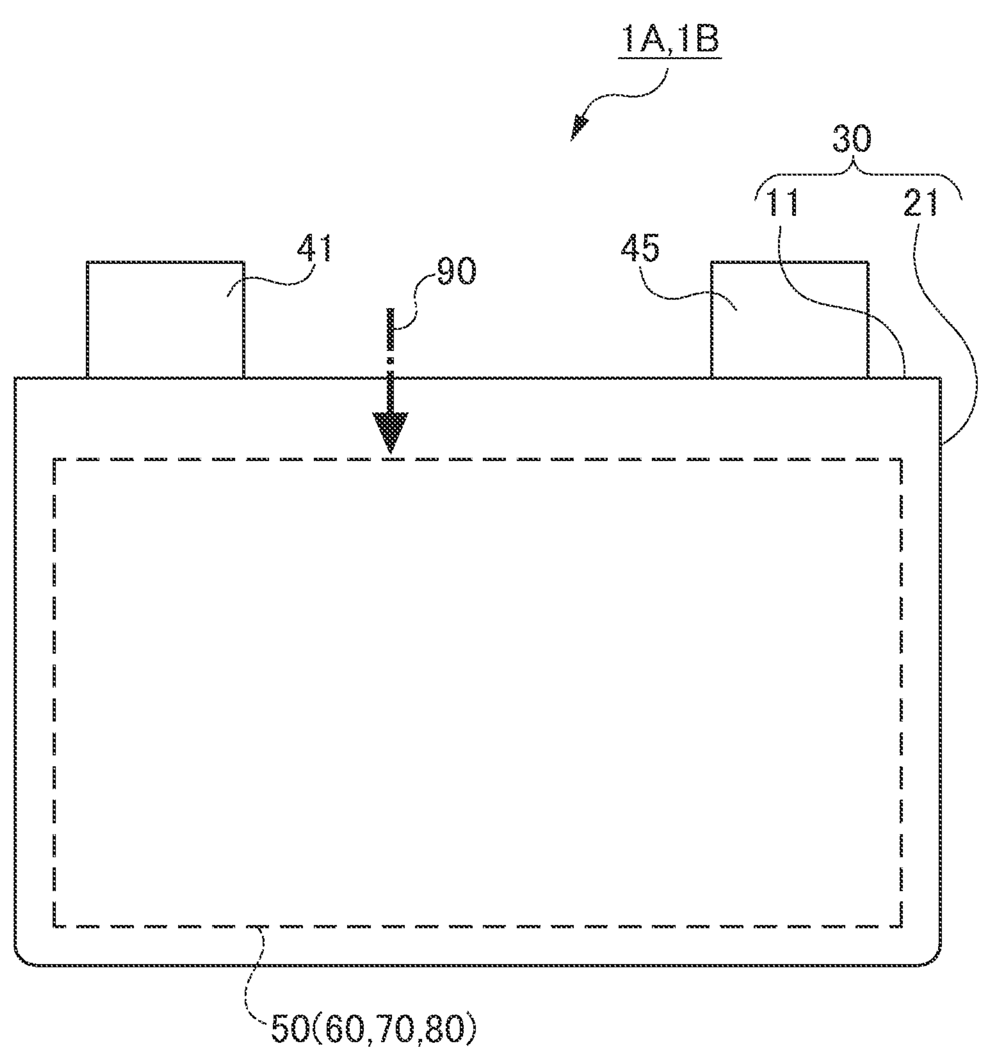
FIG. 9 is another explanatory view for explaining the producing method for the lithium-ion secondary battery.

Subsequently, in step S5 of an injecting step, the non-aqueous electrolytic solution 90 is injected into the battery case 30 housed with the electrode body 50 to produce an injection-completed battery 1B (see FIG. 9). To be specific, the lid 11 of the battery case 30 configuring the assembly-completed battery 1A is formed with a not-shown liquid inlet. The non-aqueous electrolytic solution 90 is injected through the liquid inlet into the battery case 30 configuring the assembly-completed battery 1A. Thus, the non-aqueous electrolytic solution 90 is impregnated in the electrode body 50 and the solution 90 is also introduced to a bottom surface side in the battery case 30. Thereafter, the liquid inlet is sealed and the injection-completed battery 1B is produced.

Subsequently, in step S6 of an initial charging step, the injection-completed battery 1B is initially charged. Thus, the injection-completed battery 1B is activated to become the lithium-ion secondary battery 1. In the initial charging step of the present embodiment, the injection-completed battery 1B has been performed with constant-current charging at a constant current value of 0.2 C until a battery voltage value of the battery 1B reaches 4.1 V. Thereafter, the lithium-ion secondary battery 1 finished with the initial charging is tested, and then the lithium-ion secondary battery 1 is completed and gets ready for shipment.

Heretofore, when a lithium-ion secondary battery, which includes a positive electrode plate provided with a positive active material layer on a surface of a positive current collecting foil formed of an aluminum foil, a negative electrode plate, and non-aqueous electrolytic solution including $LiPF_6$, is applied with high-load energization such as boost charging, there is a case that local points in the positive current collecting foil exhibit high potential. These local points with high potential get corroded to cause liquation of aluminum from surfaces of these points, and the thus liquated aluminum is deposited on a negative electrode surface, which could cause internal short circuit. Specifically, in the lithium-ion secondary battery at the initial stage of use, the coating of $AlF_3$ with high corrosion resistance has not been formed enough on a surface of the positive current collecting foil, which could bring about liquation of aluminum due to the above-mentioned corrosion.

To address the above problem, in the present embodiment, the positive electrode paste 63P including the hydroxide particles 67 (specifically, LiOH particles) is produced in the step S1 of the positive electrode paste producing step as mentioned above. Thereafter, in the step S2 of the positive electrode plate producing step, the positive electrode paste 63P including the hydroxide particles 67 is applied on the first surface 61*b* and the second surface 61*c* of the positive current collecting foil 61 to produce the positive electrode plate 60 including the positive active material layer 63 provided with the hydroxide particles 67 on the first surface 61*b* and the second surface 61*c* of the positive current collecting foil 61. Then, the lithium-ion secondary battery 1 is produced with this positive electrode plate 60.

Use of the thus configured positive electrode plate 60 for producing the lithium-ion secondary battery 1 promotes formation of coating of $AlF_3$ with high corrosion resistance on the first surface 61*b* and the second surface 61*c* of the positive current collecting foil 61 in the process of producing the battery 1. To be more specific, after the non-aqueous electrolytic solution 90 is injected in the battery case 30, in which the positive electrode plate 60 and others are housed, and until the battery 1 gets ready for shipment, the following series of reactions (a) to (c) occurs to promote formation of the $AlF_3$ coating on the first surface 61*b* and the second surface 61*c* of the positive current collecting foil 61 as compared with the conventional technique. Especially in the initial charging step, the following series of reactions (a) to (c) is encouraged, thereby promoting formation of the $AlF_3$ coating. The $Al_2O_3$ coating which is an oxide film is formed on each of the first surface 61*b* and the second surface 61*c* of the positive current collecting foil 61 (the aluminum foil) to be used in the step S2 of the positive-electrode-plate producing step.

(a) LiOH included in the positive active material layer 63 is decomposed, and thus $H_2O$ is formed.

$$2LiOH \rightarrow Li_2O + H_2O \quad \text{(Formula 1)}$$

(b) The formed $H_2O$ makes reaction with $LiPF_6$ in the non-aqueous electrolytic solution, and thus HF is formed.

$$LiPF_6 + H_2O \rightarrow LiF + POF_3 + 2HF \quad \text{(Formula 2)}$$

(c) The formed HF makes reaction with $Al_2O_3$ coating on the first surface 61*b* and the second surface 61*c* of the positive current collecting foil 61, and thus $AlF_3$ coating is formed on the first surface 61*b* and the second surface 61*c* of the positive current collecting foil 61.

$$Al_2O_3 + 6HF \rightarrow 2AlF_3 + 3H_2O \quad \text{(Formula 3)}$$

Accordingly, the lithium-ion secondary battery 1 produced as mentioned above has higher corrosion resistance on the first surface 61*b* and the second surface 61*c* of the positive current collecting foil 61 than the conventional lithium-ion secondary battery at the time when the battery is completed and gets ready for shipment. Therefore, in the lithium-ion secondary battery 1 produced by the above-mentioned producing method, "Al liquation from the first surface 61*b* and the second surface 61*c* of the positive current collecting foil 61 when the high-load energization is performed at the initial stage of use" can be reduced as compared with the conventional lithium-ion secondary battery.

Examples 1 to 5

In examples 1 to 5, the positive electrode paste 63P is produced in step S1 of the positive electrode paste producing step such that the mixing ratio (wt %) of the hydroxide particles 67 to the solid contents (specifically, the positive active material particles 64, the binder 65, and the conductive material 66) exclusive of the hydroxide particles 67 among the solid contents of the positive electrode paste 63P is differentiated. Namely, a weight ratio of the hydroxide particles 67 to the solid contents exclusive of the hydroxide particles 67 among the solid contents of the positive electrode paste 63P is differentiated in each of the examples 1 to 5 in producing the positive electrode paste 63P. Lithium-ion secondary batteries 1 in the examples 1 to 5 are produced similarly other than the mixing ratio, namely, the weight ratio.

To be more specific, in the example 1, the mixing ratio of the hydroxide particles 67 is set as 0.1 wt % relative to the solid contents exclusive of the hydroxide particles 67 among the solid contents of the positive electrode paste 63P (hereinafter, simply referred as the mixing ratio of the hydroxide particles 67) in the positive electrode paste producing step. In the example 2, the mixing ratio of the hydroxide particles 67 is set as 0.5 wt %. In the example 3, the mixing ratio of the hydroxide particles 67 is set as 1.0 wt %. In the example 4, the mixing ratio of the hydroxide particles 67 is set as 3.0 wt %. In the example 5, the mixing ratio of the hydroxide particles 67 is set as 5.0 wt %.

Comparative Example 1

In the comparative example 1, the mixing ratio of the hydroxide particles 67 is set as 0 wt % relative to the solid contents exclusive of the hydroxide particles 67 among the solid contents of the positive electrode paste 63P in the positive electrode paste producing step. Namely, the positive electrode paste including no hydroxide particles 67 is produced in the comparative example 1. The lithium-ion secondary battery in the comparative example 1 is produced in a manner similar to the example 1 other than the above mixing ratio of the hydroxide particles.

<Study about $AlF_3$ Coating of Positive Current Collecting Foil>

Next, study has been made to $AlF_3$ coating on the respective surfaces of the positive current collecting foils for the lithium-ion secondary batteries in the examples 1 to 5 and the comparative example 1. The lithium-ion secondary batteries as objects to be studied are lithium-ion secondary batteries which have all been completed and got ready for shipment as unused products (that is, new products).

Specifically, the respective lithium-ion secondary batteries are disassembled to take out the positive electrode plates. The thus taken positive electrode plates are each impregnated in ethyl methyl carbonate for 10 minutes and then dried so that component of the non-aqueous electrolytic solution 90 attached to the positive electrode plate is removed. Thereafter, the positive active material layer is separated from the positive current collecting foil 61 of this positive electrode plate to expose the first surface 61*b* and the second surface 61*c* of the positive current collecting foil 61. Then, the first surface 61*b* and the second surface 61*c* of the positive current collecting foil 61 are analyzed by use of SEM-EDX (Energy Dispersive X-ray Spectroscopy) to calculate ratio of F element to Al element (F/Al). Results of this study is shown in a table 1. Respective values of F/Al indicated in the table 1 are average values of F/Al of the first surface 61*b* and F/Al of the second surface 61*c*. The larger the value F/Al is, the more the $AlF_3$ coating exists on the first surface 61*b* and the second surface 61*c* of the positive current collecting foil 61.

TABLE 1

| | Hydroxide Particles (wt %) | F/Al | Al pitting corrosion | Discharge capacity |
|---|---|---|---|---|
| Example 1 | 0.1 | 0.3 | Fine | Good |
| Example 2 | 0.5 | 0.8 | Good | Good |
| Example 3 | 1.0 | 1.1 | Good | Good |
| Example 4 | 3.0 | 1.2 | Good | Good |
| Example 5 | 5.0 | 1.6 | Good | Fine |
| Comp. Example 1 | 0 | 0.1 | Poor | Good |

As shown in the table 1, the lithium-ion secondary batteries in the examples 1 to 5 have larger F/Al values than the lithium-ion secondary battery in the comparative example 1. The positive electrode plate 60 is produced by use of the positive electrode paste 63P including the hydroxide particles 67 reflecting the above result, and the lithium-ion secondary batteries 1 are produced with the thus produced positive electrode plates 60. Thereby, formation of $AlF_3$ coating is promoted on the first surface 61*b* and the second surface 61*c* of the positive current collecting foil 61, and thus corrosion resistance of the first surface 61*b* and the second surface 61*c* of the positive current collecting foil 61 is enhanced.

<High-Load Energization Test>

Next, the lithium-ion secondary batteries according to the examples 1 to 5 and the comparative example 1 are performed with high-load energization test. The lithium-ion secondary batteries used for the subject test are lithium-ion secondary batteries that have been completed and got ready for shipment as unused items, namely new products. Therefore, for the lithium-ion secondary batteries to be used for the subject test, the high-load energization in the subject test represents the high-load energization at the initial stage of use of those batteries.

In the subject test, 20 cycles of charge and discharge were performed with the following charge and discharge as one cycle under the temperature environment of 25° C. in the respective lithium-ion secondary batteries. Specifically, one cycle of the charge and discharge is as follows. Firstly, each battery is charged at a current value of 0.2 C until a battery voltage value reaches 3.5 V. The battery is thereafter left suspended for 10 minutes. After that, the battery is charged at the current value of 1 C until the battery voltage value reaches 4.0 V. After that, the battery is left suspended for 10 minutes. This charge and discharge cycle is defined as one cycle, and 20 cycles of the charge and discharge are carried out.

The respective lithium-ion secondary batteries are applied with the above-mentioned 20 cycles of the charge and discharge, and then presence and absence of aluminum liquation on the first surface 61*b* and the second surface 61*c* of the positive current collecting foil 61 is studied for the respective lithium-ion secondary batteries. Specifically, after performing 20 cycles of the charge and discharge, the respective lithium-ion secondary batteries are disassembled to take out the positive electrode plates. The thus taken positive electrode plates are each impregnated in ethyl methyl carbonate for 10 minutes and then dried so that component of the non-aqueous electrolytic solution 90 attached to the positive electrode plate is removed. Thereafter, the positive active material layer is separated from the positive current collecting foil 61 of this positive electrode plate to expose the first surface 61*b* and the second surface 61*c* of the positive current collecting foil 61. Then, the first surface 61*b* and the second surface 61*c* of the positive current collecting foil 61 are observed by a microscope to confirm presence or absence of pitting corrosion. Herein, the pitting corrosion is caused by aluminum liquation from the first surface 61*b* and the second surface 61*c* of the positive current collecting foil 61. Accordingly, from the presence or absence of the pitting corrosion, presence or absence of the aluminum liquation can be determined. Results of this test is shown in the table 1. In the table 1, the pitting corrosion is indicated as “Al pitting corrosion” and is evaluated by three grades of “Good”, “Fine”, and “Poor”.

As shown in the table 1, in the examples 2 to 5, Al pitting corrosion is evaluated as Good, and no pitting corrosion exist on the first surface 61*b* and the second surface 61*c* of the positive current collecting foil 61. This result proves that, in the respective lithium-ion secondary batteries in the examples 2 to 5, Al liquation from the first surface 61*b* and the second surface 61*c* of the positive current collecting foil 61 can be prevented when the high-load energization is performed at the initial stage of use. Accordingly, the lithium-ion secondary batteries 1 in the examples 2 to 5 are defined as lithium-ion secondary batteries which are difficult to generate Al liquation from the first surface 61*b* and the second surface 61*c* of the positive current collecting foil 61 when the high-load energization is performed at the initial stage of use.

On the other hand, the evaluation of the Al pitting corrosion in the comparative example 1 is Poor, and a large number of the pitting corrosion exists on the first surface 61*b* and the second surface 61*c* of the positive current collecting foil 61. Therefore, the lithium-ion secondary battery of the comparative example 1 is defined as a lithium-ion secondary battery which is easy to generate Al liquation from the first surface 61*b* and the second surface 61*c* of the positive current collecting foil 61 when the high-load energization is performed at the initial stage of use.

Further, the evaluation of the Al pitting corrosion in the example 1 is Fine, and the pitting corrosion exists on the first surface 61*b* and the second surface 61*c* of the positive current collecting foil 61, but the number of the pitting corrosion is less than that of the comparative example 1 and each size of the pitting corrosion is smaller than that of the comparative example 1. From the above results, the lithium-ion secondary battery 1 of the example 1 can achieve reduction in the Al liquation from the first surface 61*b* and the second surface 61*c* of the positive current collecting foil 61 when the high-load energization is performed at the initial stage of use as compared with the lithium-ion secondary battery of the comparative example 1. Therefore, the lithium-ion secondary battery 1 of the example 1 can be defined as a lithium-ion secondary battery which is difficult to generate the Al liquation from the first surface 61*b* and the second surface 61*c* of the positive current collecting foil 61 when the high-load energization is performed at the initial stage of use as compared with the lithium-ion secondary battery of the comparative example 1.

From the above results, it is possible to produce the lithium-ion secondary battery that achieves reduction in "Al liquation from the surface of the positive current collecting foil when the high-load energization is performed at the initial stage of use" by producing the positive electrode plate 60 with the positive electrode paste 63P including the hydroxide particles 67 and producing the lithium-ion secondary battery 1 with this positive electrode plate 60. Therefore, the producing method of the present embodiment is a producing method for a lithium-ion secondary battery achieving reduction in "Al liquation from a surface of a positive current collecting foil when high-load energization is performed at an initial stage of use."

<Discharge Capacity Measurement Test>

The respective lithium-ion secondary batteries in the examples 1 to 5 and the comparative example 1 are measured with their discharge capacities. Specifically, the respective lithium-ion secondary batteries are charged at a current value of 0.2 C until a battery voltage value reaches 4.2 V. Thereafter, charging is kept performed while maintaining the battery voltage value as 4.2 V so that the SOC reaches 100%. Then, the batteries are discharged at the current value of 0.2 C until the battery voltage value falls to 3.0 V. Thereafter, discharging is kept performed while maintaining the battery voltage value as 3.0 V so that the SOC reaches 0%. At this time, the discharge electric quantity from the SOC 100% to the SOC 0% is measured as the discharge capacity of the respective lithium-ion secondary batteries. Each discharge capacity of the respective lithium-ion secondary batteries is then evaluated, and the results are shown in the table 1.

As indicated as "Good" in the table 1, the lithium-ion secondary batteries in the examples 1 to 4 and the comparative example 1 can exhibit adequate discharge capacity. Specifically, the discharge capacity of the lithium-ion secondary battery in the comparative example 1 is the largest. The higher the mixing ratio (wt %) of the hydroxide particles 67 (that is, LiOH) is made in producing the lithium-ion secondary battery, the smaller the discharge capacity becomes. In detail, each discharge capacity of the lithium-ion secondary batteries in the examples 1 to 4 is smaller than the discharge capacity of the lithium-ion secondary battery in the comparative example 1, but the decline level is just a little.

On the other hand, as indicated as "Fine" in the table 1, the lithium-ion secondary battery in the example 5 is smaller in the discharge capacity than the lithium-ion secondary battery in the comparative example 1, and the decline level is larger than those of the lithium-ion secondary batteries in the examples 1 to 4. These results have proved that the mixing ratio of 5.0 wt % or more of the hydroxide particles 67 (specifically, LiOH) results in large decline in the discharge capacity of the lithium-ion secondary battery.

The above results of the high-load energization test and the discharge capacity measurement test have proved that the mixing ratio of the hydroxide particles 67 is preferably within a range from 0.5 wt % or more to less than 5.0 wt % in the positive electrode paste producing step. To be specific, from the results of the high-load energization test, inclusion of the hydroxide particles 67 in the positive electrode paste 63P brings an effect of reducing the Al liquation from the positive current collecting foil 61, and furthermore, the mixing ratio of 0.5 wt % or more of the hydroxide particles 67 can further assuredly achieve prevention of the Al liquation from the positive current collecting foil 61. However, the results of the discharge capacity measurement test has proved that the mixing ratio of 5.0 wt/o or more of the hydroxide particles 67 leads to large decline in the discharge capacity of the lithium-ion secondary battery. Accordingly, in the positive electrode paste producing step, it is more preferable to arrange the mixing ratio of the hydroxide particles 67 to be within a range from 0.5 wt % or more to less than 5.0 Wt %.

As mentioned above, the present disclosure has been explained along with the embodiment, but the present disclosure is not limited to the above-mentioned embodiment and may be appropriately modified without departing from the scope of the disclosure.

For example, the present embodiment is exemplified by using LiOH particles as the hydroxide particles 67. However, using other hydroxide particles may also promote formation of $AlF_3$ coating on the first surface 61*b* and the second surface 61*c* of the positive current collecting foil 61, and thus corrosion resistance of the first surface 61*b* and the second surface 61*c* of the positive current collecting foil 61 can be improved. Thus, it is possible to reduce "Al liquation from the surface of the positive current collecting foil when high-load energization is performed at an initial stage of use." Specifically, when other hydroxide particles different from LiOH particles are used, the subject hydroxide particles are decomposed in the positive active material layer to generate $H_2O$. Thereby, the reactions of the above-mentioned formulas (2) and (3) occur, so that coating of $AlF_3$ is formed on the surface of the positive current collecting foil.

REFERENCE SIGNS LIST

1 Lithium-ion secondary battery
1B Injection-completed battery
30 Battery case
50 Electrode body

60 Positive electrode plate

61 Positive current collecting foil

63 Positive active material layer

63P Positive electrode paste

64 Positive active material particles

65 Binder

66 Conductive material

67 Hydroxide particles

69 Solvent

70 Negative electrode plate

90 Non-aqueous electrolytic solution

What is claimed is:

1. A method for producing a lithium-ion secondary battery comprising a positive electrode plate provided with a positive active material layer on a surface of a positive current collecting foil formed of an aluminum foil, a negative electrode plate, non-aqueous electrolytic solution including $LiPF_6$, and a battery case to house the positive electrode plate, the negative electrode plate, and the non-aqueous electrolytic solution, the method including:

producing a positive electrode paste by mixing positive active material particles with a solvent, wherein the positive electrode paste comprises more than 2.0 wt % and less than 5.0 wt % of LiOH particles relative to a solid content of the positive electrode paste exclusive of the LiOH particles;

applying the positive electrode paste on the surface of the positive current collecting foil and drying the applied positive electrode paste to produce the positive electrode plate having the positive active material layer on the surface of the positive current collecting foil;

providing the positive electrode plate and the negative electrode plate to produce an electrode body;

housing the electrode body in the battery case;

injecting the non-aqueous electrolytic solution into the battery case housed with the electrode body to produce an injection-completed battery; and initially charging the injection-completed battery.

* * * * *